United States Patent [19]

Ma et al.

[11] 3,920,367

[45] Nov. 18, 1975

[54] MOLD PRESSURE CONTROL APPARATUS

[75] Inventors: Carlton Y. W. Ma; Edwin Dean Ailman, both of Cincinnati, Ohio

[73] Assignee: Cincinnati Milacron Inc., Cincinnati, Ohio

[22] Filed: May 10, 1973

[21] Appl. No.: 358,839

[52] U.S. Cl. ............................. 425/149; 235/151.1
[51] Int. Cl.² ........................................... B29F 1/06
[58] Field of Search.................... 425/145, 149, 155; 235/151.1, 183

[56] References Cited
UNITED STATES PATENTS

| | | | |
|---|---|---|---|
| 3,521,046 | 7/1970 | Tippetts.......................... | 235/183 X |
| 3,642,404 | 2/1972 | Nagawa ............................ | 425/145 |
| 3,721,512 | 3/1973 | Ma et al............................ | 425/149 |
| 3,767,339 | 10/1973 | Hunkar........................... | 425/149 X |
| 3,799,719 | 3/1974 | Bonikowski et al. ............ | 425/155 X |

OTHER PUBLICATIONS

Modern Plastics; "Here's The First Computer-Controlled Injection Machine"; Robert Currie; 10/1968.

*Primary Examiner*—Robert D. Baldwin
*Attorney, Agent, or Firm*—Daniel P. Worth

[57] ABSTRACT

An apparatus for providing a uniform holding pressure in the mold cavity of an injection molding machine on successive cycles of the machine so as to insure a high degree of uniformity in the parts being produced. A signal representative of the pressure in the mold cavity is integrated over a predetermined time interval during the holding pressure phase of the machine cycle and this signal is compared with a reference signal. The error, if any, is used to adjust the holding pressure on the next cycle and thus maintain it at whatever value is represented by the reference signal.

4 Claims, 2 Drawing Figures

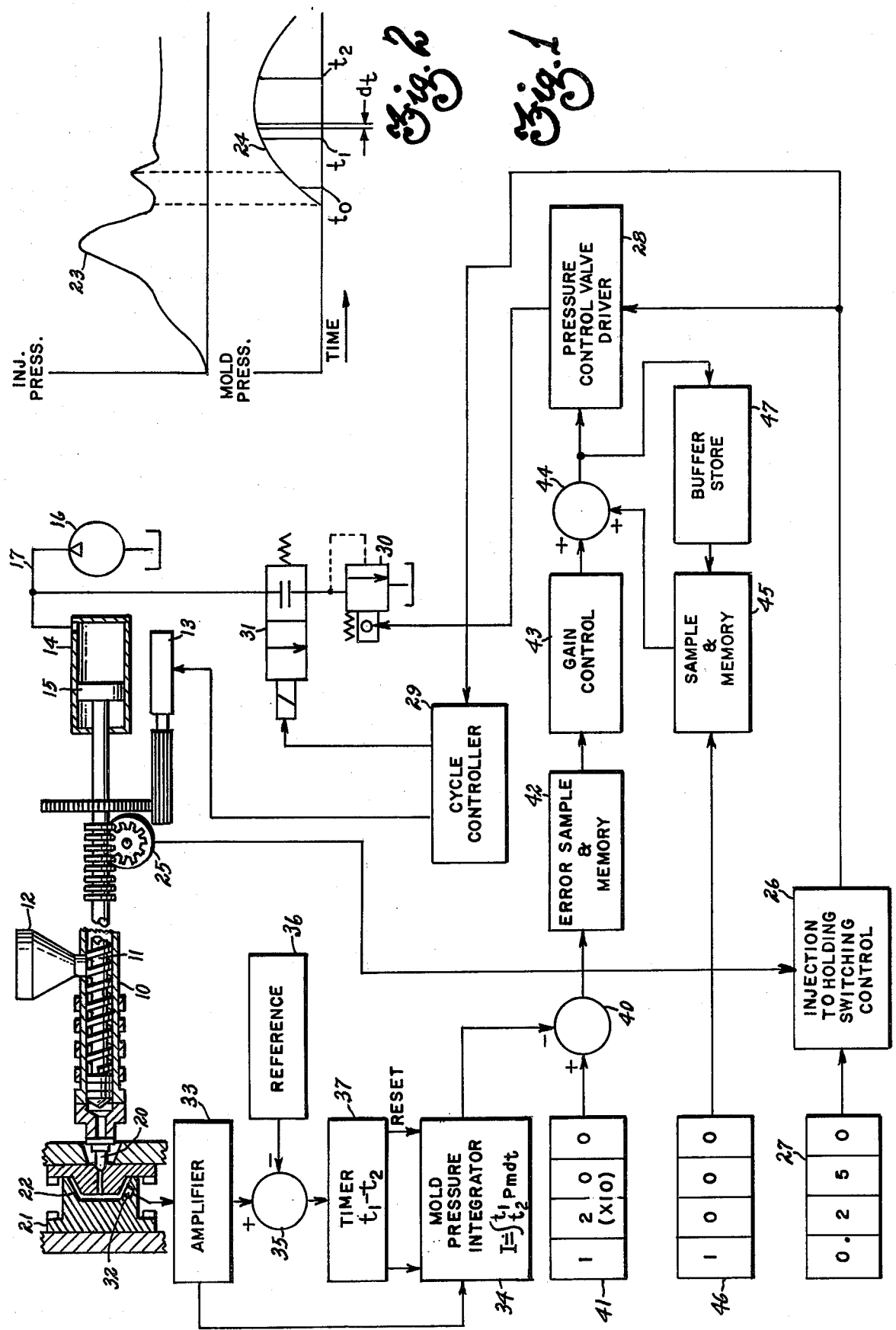

MOLD PRESSURE CONTROL APPARATUS

BACKGROUND OF THE INVENTION

In the injection molding process, the problem of producing consistent and uniform parts has always been troublesome. This is due to the many factors which affect the weight, strength and quality of the parts during the molding cycle. Such variables as the shot size, viscosity of the melt, cycling rate, injection pressure, mold pressure, etc. all affect the nature of the final product. Each of these factors must be closely controlled in order to obtain parts of consistent quality. For example, it has been found that unless the pressure within the mold cavity during curing is held constant on successive cycles of the machine, the amount of shrinkage of the parts will vary and the parts will differ in size and weight.

In the past, it has been recognized that variations in the mold pressure during the curing or holding portion of the cycle will result in poor parts consistency. Accordingly, it has been proposed that means be provided for measuring the peak pressure occurring in the mold cavity during the holding phase and utilizing this parameter as a control to maintain the mold peak pressure constant during each molding cycle. In following this approach, however, it is to be realized that the peak pressure may be of a transitory nature and therefore will not be representative of the total "packing" effort applied to the mold which is a function of both time and pressure.

SUMMARY OF THE INVENTION

According to the present invention, in order to control and maintain the molded parts consistent as to size, density and quality, the pressure in the mold cavity during the holding phase is converted into an electrical quantity which is then integrated over a predetermined time interval and compared with a reference signal to provide an error signal. This signal is used to modify the pressure applied to the mold in the next cycle so as to eliminate the error indicated thereby. Thus, the control exercised in accordance with the present invention is based on the total polymer energy stored in the mold cavity over the selected time interval and represents the total effort applied to the mold. Hence, it provides a good indicator of conditions in the mold during the holding phase and therefore provides a means for obtaining consistent results insofar as part size and quality is concerned.

IN THE DRAWINGS

FIG. 1 is a schematic diagram of a preferred embodiment of the invention.

FIG. 2 is a graph showing a set of typical pressure — time curves, one denoting pressure in the nozzle and the other denoting pressure in the mold.

DESCRIPTION OF PREFERRED EMBODIMENT

The present invention is shown incorporated in the injection molding apparatus illustrated schematically in FIG. 1 wherein a barrel 10 housing a screw or ram 11 receives molding compound from a hopper 12. Rotation of the screw by a motor 13 causes the molding compound to be fed to the forward end of the barrel where it accumulates in front of the screw as the latter is forced rearwardly against back pressure provided by a cylinder 14. The cylinder contains a piston 15 mounted on the rear end of the screw 11 and is supplied with hydraulic pressure from a source 16 through a line 17.

At its forward end the barrel terminates in a nozzle 20 which fits into the sprue or gate of a mold 21 having a cavity 22 formed therein. When the screw 11 reaches a predetermined rearward position representing the required shot size, approximately full pump pressure is applied to the cylinder 15 thereby propelling the screw forwardly in the barrel and injecting the plasticized compound into the mold.

This portion of the cycle is represented by the left hand part of the curve 23 (FIG. 2) which indicates the build-up in pressure ahead of the screw when it moves forwardly in the barrel. The pressure in the mold cavity, represented by the lower curve 24, remains approximately zero until the cavity is filled after which it rises to a maximum where it is held by the holding pressure applied by the screw until the gate freezes. The switch from injection pressure to a somewhat lower holding pressure is affected by a position readout mechanism 25 which applies a signal to a switching control 26 where it is compared with a reference position signal 27. When the two coincide, a gating signal is transmitted to a valve driver circuit 28 which is thereby enabled and causes a modulating signal to be applied to a pressure control valve 30. At the same time, a signal is sent to a cycle controller 29 which energizes the solenoid of a valve 31 which connects the pressure control valve 30 to the line 17 so as to maintain holding pressure on the screw.

The pressure in the mold cavity is sensed by a transducer 32 and the low-level signal therefrom is amplified at 33 and thence delivered to an integrating circuit 34. The output of amplifier 33 is also passed to a circuit 35 where it is compared with a reference signal derived from a source 36. The output of the circuit 35 is transmitted to a timer 37 and gates the timer on whenever the output is positive. The reference signal is set to correspond to a low pressure in the mold, say 100 psi, and so prevents operation of the timer 37 if any blockage occurs in the nozzle or the sprue which prevents pressure build-up in the mold.

Starting of the timer is indicated at $t_0$ in FIG. 2 and, at this time, a reset signal is transmitted from the timer to the integrator 34 to set it to zero. After a sufficient time has elapsed to permit the pressure in the mold to approach its maximum value, the timer transmits a signal to the integrator to initiate summation of the mold pressure. This time is indicated at $t_1$ in FIG. 2. After a further interval of time has elapsed, but before the mold pressure has dropped significantly, due to curing of the part in the mold, the timer transmits a further signal to the integrator to stop the integration process. The time when this occurs is indicated at $t_2$ in FIG. 2.

At the conclusion of the integrating operation, the signal representing the integral of the mold pressure from $t_1$ to $t_2$ is transmitted to a circuit 40 where it is compared with a mold pressure reference signal obtained from a source 41 which may be manually adjusted to the desired holding pressure within the mold cavity. The difference or error signal is introduced into a sample and memory circuit 42 which is reset prior to storing the error signal for use during the next cycle of operation of the molding machine. At this time; i.e., on the next cycle of operation, the error signal is read out of the memory 42 and passed through a gain control circuit 43 where its scale is adjusted to correspond to that of the injection pressure. Thereafter, the adjusted error signal is introduced into a summing circuit 44 where it is combined with an injection pressure reference signal derived from a sample and memory circuit 45. This memory is loaded from an injection pressure reference source 46 prior to or during the first cycle of the machine. Thereafter, the reference signal is retained in the memory 45 and updated from cycle to cycle with the mold pressure error signal.

After passing through the summing circuit 44 where it is added algebraically to the error signal, the injection pressure signal is applied to pressure control valve driver 28 where its power is increased sufficiently to enable it, when gated, to operate the torque motor of valve 30. Thereby, when the pressure holding phase is initiated by the control 26, the pressure applied to the screw 11 will be updated from the previous cycle to compensate for any error in the mold pressure occurring during such previous cycle.

The output of the summing circuit 44 is also transmitted to a buffer store 47 where it is held until the end of the cycle whereupon it is used to update the memory 45 in readiness for the next cycle when it will again be modified by the mold pressure error signal, if any, and applied to the control valve 30 via the driver 28.

We claim:

1. A mold pressure control means for an injection molding machine having a mold with a cavity therein and a hydraulically operated ram for forcing a predetermined quantity of fluid plastic material into the mold cavity and holding it under pressure therein for a predetermined period during the molding cycle, said control means comprising a pressure transducer in the mold cavity for providing a signal representative of the pressure in the cavity, an integrating circuit including timing means for receiving the mold cavity pressure signal and integrating it over a predetermined time interval during the holding pressure portion of the molding cycle, a reference source for providing a signal representative of a desired mold pressure, means for comparing the signal from said integrating circuit with the signal from said reference source to produce a mold pressure error signal, means for storing the error signal for use in the next machine cycle, a source of hydraulic fluid under pressure for operating said ram, and means for modulating the pressure of said fluid in the next machine cycle in accordance with the stored error signal to thereby reduce the deviation of the mold pressure from the desired pressure.

2. The mold pressure control means of claim 1 wherein said modulating means includes a memory unit for storing a holding pressure reference signal from one cycle to the next, and means for updating the holding pressure reference signal with the error signal produced in the preceding cycle so as to provide the correct holding pressure in the current cycle.

3. The mold pressure control means of claim 2 in which said modulating means also includes an electrically modulated pressure control valve, and means for driving said valve with the updated holding pressure reference signal.

4. The mold pressure control means of claim 1 wherein said timing means includes a timer for initiating and terminating integration of the cavity pressure signal by said integrating circuit, and means for activating said timer when the mold cavity pressure exceeds a predetermined value, said activating means including a reference signal source and a comparator for comparing the cavity pressure signal with the reference signal from said source.

* * * * *